United States Patent
Chen et al.

(10) Patent No.: US 9,277,293 B2
(45) Date of Patent: Mar. 1, 2016

(54) INTERACTIVE ADVERTISMENT OFFERING METHOD AND SYSTEM BASED ON A VIEWED TELEVISION ADVERTISMENT

(71) Applicant: INSTITUTE FOR INFORMATION INDUSTRY, Taipei (TW)

(72) Inventors: Yu-Hao Chen, Taipei (TW); Wen-Shan Liou, New Taipei (TW)

(73) Assignee: INSTITUTE FOR INFORMATION INDUSTRY, Taipei (TW)

(\*) Notice: Subject to any disclaimer, the term of this patent is extended or adjusted under 35 U.S.C. 154(b) by 62 days.

(21) Appl. No.: 14/228,631

(22) Filed: Mar. 28, 2014

(65) Prior Publication Data

US 2015/0143411 A1    May 21, 2015

(30) Foreign Application Priority Data

Nov. 19, 2013   (TW) .............................. 102142042 A (51) Int. Cl.
  *H04N 21/433*   (2011.01)
  *H04N 21/454*   (2011.01)
  *H04N 21/81*    (2011.01)
  *H04N 21/61*    (2011.01)
  *H04N 21/435*   (2011.01)

(52) U.S. Cl.
  CPC ........... *H04N 21/812* (2013.01); *H04N 21/435* (2013.01); *H04N 21/4331* (2013.01); *H04N 21/454* (2013.01); *H04N 21/6175* (2013.01)

(58) Field of Classification Search
  CPC    H04N 21/435; H04N 21/6175; H04N 21/812
  See application file for complete search history.

(56) References Cited

U.S. PATENT DOCUMENTS

| | | | |
|---|---|---|---|
| 6,718,551 B1* | 4/2004 | Swix et al. ...................... 725/32 |
| 2004/0261100 A1* | 12/2004 | Huber et al. .................... 725/32 |
| 2005/0033771 A1* | 2/2005 | Schmitter et al. .......... 707/104.1 |
| 2007/0011161 A1* | 1/2007 | Norton et al. ..................... 707/6 |
| 2007/0234213 A1* | 10/2007 | Krikorian et al. ............. 715/716 |
| 2008/0290987 A1* | 11/2008 | Li .................................. 340/5.1 |
| 2011/0289098 A1* | 11/2011 | Oztaskent et al. ............ 707/769 |
| 2012/0136701 A1* | 5/2012 | Relan et al. .................. 705/14.4 |
| 2012/0240177 A1* | 9/2012 | Rose ............................. 725/116 |
| 2013/0145390 A1* | 6/2013 | Sillerman ....................... 725/18 |
| 2014/0214541 A1* | 7/2014 | Pasila et al. ................ 705/14.55 |
| 2015/0089527 A1* | 3/2015 | Matsuyama et al. ............ 725/19 |

\* cited by examiner

*Primary Examiner* — Randy Flynn
(74) *Attorney, Agent, or Firm* — Osha Liang LLP (57) ABSTRACT

In interactive advertisement offering method and system, a server wirelessly receives from a user terminal an input signal, which is associated with a target TV advertisement viewed by a user of the user terminal. Upon identifying one TV advertisement to be the target TV advertisement based on the input signal, the server determines one of pre-stored Internet advertisements as a reference advertisement based on key terms representative of the target TV advertisement, and then transmits to the user terminal a reference advertisement menu generated thereby along with pre-stored Internet advertisement content corresponding to the reference advertisement for display of the reference advertisement menu on the user terminal.

20 Claims, 5 Drawing Sheets

INTERACTIVE ADVERTISMENT OFFERING METHOD AND SYSTEM BASED ON A VIEWED TELEVISION ADVERTISMENT

CROSS-REFERENCE TO RELATED APPLICATION

This application claims priority to Taiwanese Application No. 102142042, filed on Nov. 19, 2013, the contents of which are hereby incorporated by reference.

BACKGROUND OF THE INVENTION

1. Field of the Invention

The invention relates to advertisement offering method and system, and more particularly to interactive advertisement offering method and system based on a viewed television (TV) advertisement.

2. Description of the Related Art

Traditionally, TV advertisements can provide promoted goods information for TV viewers. When a TV viewer, who wants to buy a desired product, views a TV advertisement of a similar product and finds it uninteresting due to, for example, its brand or price, it is desirable to offer the TV viewer one or more other advertisements associated with products similar to the desired product.

SUMMARY OF THE INVENTION

Therefore, an object of the present invention is to provide interactive advertisement offering method and system that can offer a television (TV) viewer at least one Internet advertisement based on a selected TV advertisement.

According to one aspect of the present invention, there is provided an interactive advertisement offering method to be implemented by a system that includes a user terminal, and a server connected to the user terminal via a wireless communication network. The server includes a processing unit, and a database unit for pre-storing a plurality of television (TV) advertisement contents corresponding respectively to a plurality of TV advertisements, a plurality of Internet advertisement contents corresponding respectively to a plurality of Internet advertisements, a plurality of key term contents each corresponding to a respective one of the TV and Internet advertisements and each including a number of key terms that are representative of the respective one of the TV and Internet advertisements, and a plurality of identification data each corresponding to a respective one of the TV advertisements and each being generated based on the TV advertisement content that corresponds to the respective one of the TV advertisements. The interactive advertisement offering method of the present invention comprises the steps of:

a) the user terminal transmitting an input signal to the server, the input signal being associated with a target TV advertisement;

b) the processing unit identifying one of the TV advertisements to be the target TV advertisement based on the input signal and the plurality of the identification data pre-stored in the database unit;

c) the processing unit determining one(s) of the Internet advertisements as at least one reference advertisement based at least on the key term contents pre-stored in the database unit, wherein the key term content, which corresponds to said at least one reference advertisement, and the key term content, which corresponds to the target TV advertisement, has at least one common key term; and d) the processing unit generating, based on the Internet advertisement content that corresponds to said at least one reference advertisement determined in step c), a reference advertisement menu in which said at least one reference advertisement is listed, and transmitting the reference advertisement menu and the Internet advertisement content that corresponds to said at least one reference advertisement to the user terminal.

According to another aspect of the present invention, an interactive advertisement offering system comprises a server and a user terminal. The server includes a wireless communication module, a database unit, and a processing unit coupled to the communication module and the database unit. The user terminal is connected to the wireless communication module via a wireless communication network for transmitting an input signal to the wireless communication module. The input signal is associated with a target TV advertisement.

The database unit includes a first database and a second database. The first database pre-stores a plurality of TV advertisement contents corresponding respectively to a plurality of TV advertisements in which the target TV advertisement is included, a plurality of Internet advertisement contents corresponding respectively to a plurality of Internet advertisements, and a plurality of key term contents each corresponding to a respective one of the TV and Internet advertisements and each including a number of key terms that are representative of the respective one of the TV and Internet advertisements. The second database pre-stores a plurality of identification data each corresponding to a respective one of the TV advertisements and each being generated based on the TV advertisement content that corresponds to the respective one of the TV advertisements.

The processing unit includes a target advertisement judgment module, a reference advertisement determination module and a data generation module. The target advertisement judgment module receives the input signal from the user terminal through the wireless communication module. The target advertisement judgment module is operable to identify one of the TV advertisements to be the target TV advertisement based on the input signal and the plurality of the identification data pre-stored in the second database. The reference advertisement determination module is operable to determine one(s) of the Internet advertisements as at least one reference advertisement based at least on the key term contents pre-stored in the first database. The key term content, which corresponds to said at least one reference advertisement, and the key term content, which corresponds to the target TV advertisement, has at least one common key term. The data generation module is operable to generate, based on the Internet advertisement content that corresponds to said at least one reference advertisement determined by the reference advertisement determination module, a reference advertisement menu in which said at least one reference advertisement is listed, and to transmit the reference advertisement menu and the Internet advertisement content corresponding to said at least one reference advertisement to the user terminal through the wireless communication module.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 1:
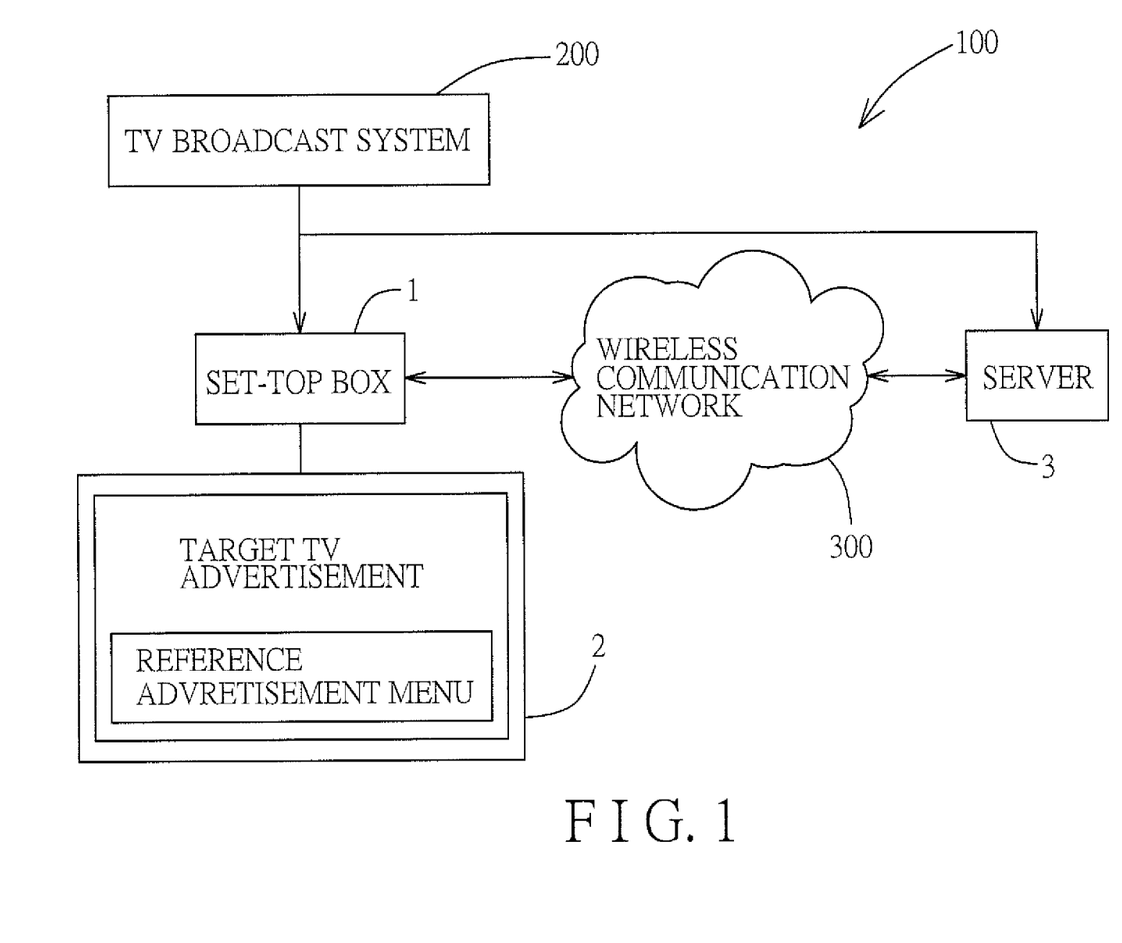
FIG. 1 is a schematic block diagram illustrating the first preferred embodiment of an interactive advertisement offering system according to the present invention.
Figure 2:
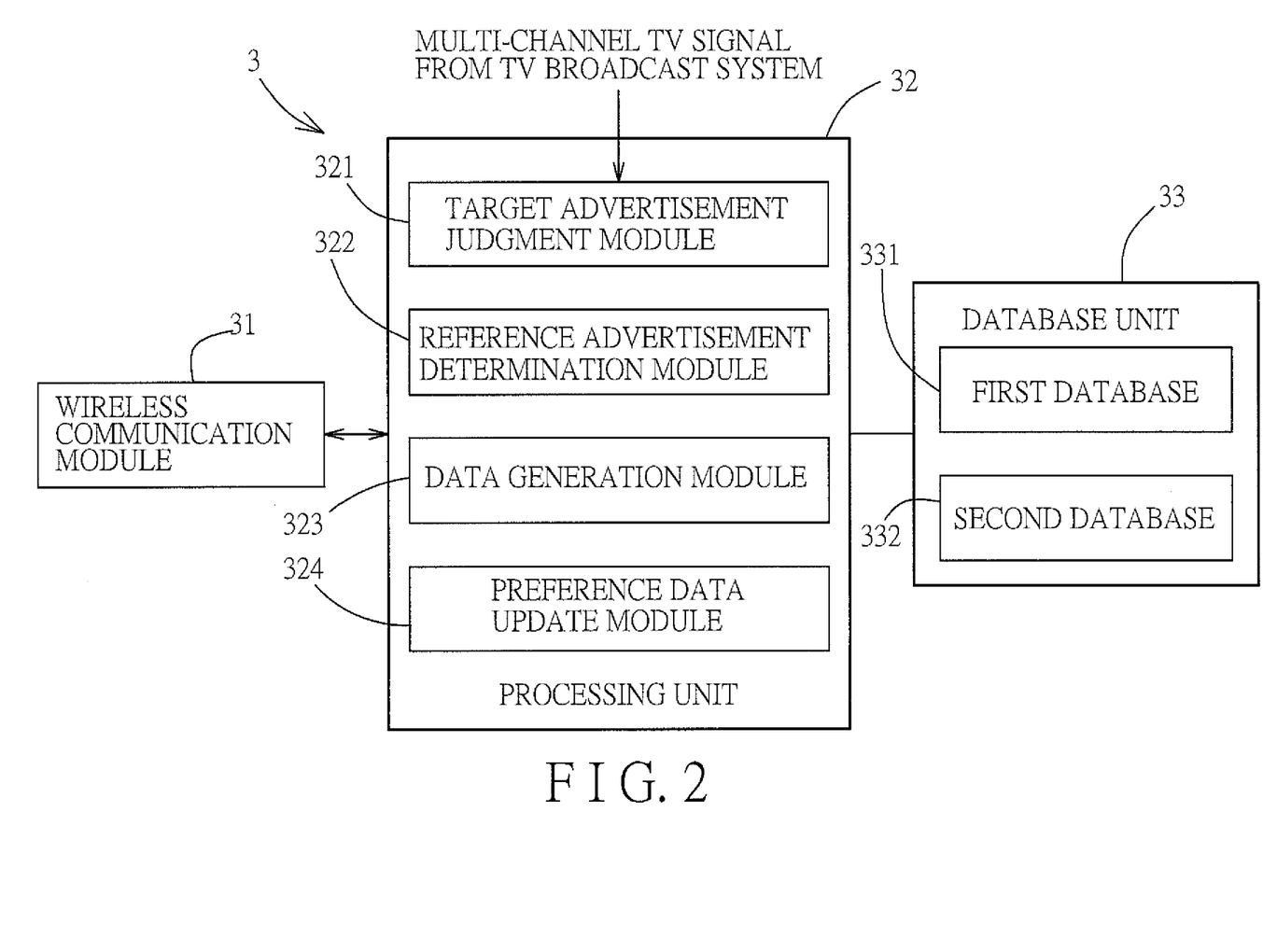
FIG. 2 is a schematic block diagram illustrating a server of the first preferred embodiment.

Referring to FIGS. 1 and 2, the first preferred embodiment of an interactive advertisement offering system 100 according to the present invention is shown to include a set-top box 1, a television (TV) 2 and a server 3. In this embodiment, an assembly of the set-top box 1 and the TV 2 serves as a user terminal of the present invention. In other embodiments, the user terminal can be a smart TV having an integrated set-top box.

The set-top box 1 is used to be connected to a TV broadcast system 200 for receiving a multi-channel TV signal therefrom. The set-top box 1 is capable of establishing a communication link with a wireless communication network 300, such as the Internet.

The TV 2 is connected electrically to the set-top box 1 to play broadcasted data from the set-top box 1 in response to a selection by a user.

The server 3 is connected to the set-top box 1 via the wireless communication network 300. The server 3 includes a wireless communication module 31, a processing unit 32 and a database unit 33. The wireless communication module 31 communicates with the set-top box 1 via the wireless communication network 300.

The processing unit 32 is coupled to the wireless communication module 31, and includes a target advertisement judgment module 321, a reference advertisement determination module 322, a data generation module 323 and a preference data update module 324. It is noted that, in this embodiment, the target advertisement judgment module 321 is used to be connected to the TV broadcast system 200 for receiving the same multi-channel TV signal therefrom.

The database unit 33 is coupled to the processing unit 32, and includes a first database 331 and a second database 332. The first database 331 pre-stores a plurality of TV advertisement contents corresponding respectively to a plurality of TV advertisements, a plurality of Internet advertisement contents corresponding respectively to a plurality of Internet advertisements, and a plurality of key term contents each corresponding to a respective one of the TV and Internet advertisements and each including a number of key terms representative of the respective one of the TV and Internet advertisements. The second database 332 pre-stores a plurality of identification data each corresponding to a respective one of the TV advertisements and being generated based on the TV advertisement content that corresponds to the respective one of the TV advertisements. In this embodiment, the Internet advertisement content of each Internet advertisement includes at least one of an advertisement banner, an advertisement picture, advertisement text, an advertisement film and advertiser contact information. In addition, the identification data corresponding to each TV advertisement includes audio and video data. However, in other embodiments, it can be audio or video data. It is noted that the second database 332 further stores user preference data associated with the user terminal. In this embodiment, the user preference data corresponds to an Internet protocol (IP) address, a media access control (MAC) address or a universally unique identifier (UUID) assigned to the set-top box 1.

Figure 3:
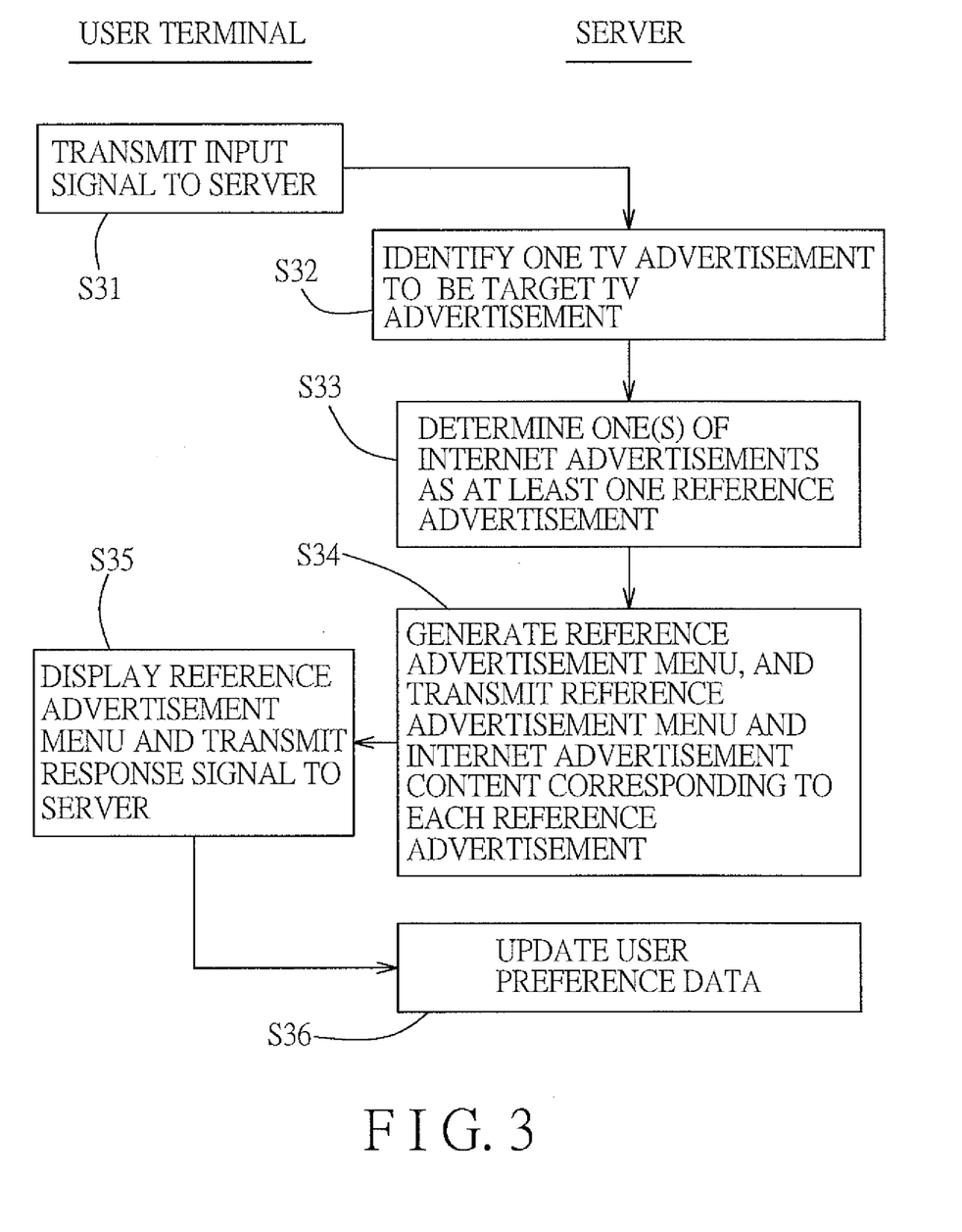
FIG. 3 is a flow chart illustrating how the interactive advertisement offering system of FIG. 1 implements an interactive advertisement offering method of the present invention.

FIG. 3 is a flow chart illustrating how the interactive advertisement offering system 100 implements an interactive advertisement offering method of the present invention.

In step S31, when the TV 2 plays a target TV advertisement, which is broadcasted on a TV channel that is supplied by the TV broadcast system 200 and that is selected by the user, the set-top box 1 transmits an input signal associated with the target TV advertisement to the server 3 via the wireless communication network 300. In this embodiment, the input signal includes channel data that indicates the selected TV channel, for example, channel number or channel name.

In step S32, upon receipt of the channel data from the set-top box 1 through the wireless communication module 31, the target advertisement judgment module 321 of the processing unit 32 of the server 3 extracts from the multi-channel TV signal, broadcasted data corresponding to the target TV advertisement based on the channel data of the time the target TV advertisement is played on the TV 2. In this embodiment, the target advertisement judgment module 321 compares the broadcasted data with the identification data pre-stored in the second database 332 and corresponding to each of the TV advertisements in a known manner in order to determine which one of the TV advertisements is the target TV advertisement, i.e., to identify one of the TV advertisements, the identification data corresponding to which matches a portion of the broadcasted data, to be the target TV advertisement. That is, the identification data of said one of the TV advertisements (i.e., the target TV advertisement), and the portion of the broadcasted data have the same audio and/or video data.

In step S33, the reference advertisement determination module 32 of the processing unit 32 of the server 3 is determines one(s) of the Internet advertisements as at least one reference advertisement based on the key term contents pre-stored in the first database 331 and on the user preference data stored in the second database 332. More specifically, the key term content, which corresponds to the at least one reference advertisement, and the key term content, which corresponds to the target TV advertisement, has at least one common key term.

In this embodiment, the user preference data includes a collection of different key terms each of which is representative of one or more reference advertisements previously selected by the user terminal, a plurality of weighting values assigned respectively to the different key terms of the collection, and a plurality of cumulative numbers corresponding respectively to the different key terms of the collection. The key term content, which corresponds to the at least one reference advertisement, the key term content, which corresponds to the target TV advertisement, and the user preference data have at least one common key term. Thus, each of the Internet advertisements has a preference value, which is obtained by accumulating the product of the cumulative number and the weighting value corresponding to each key term that is representative of the Internet advertisement. The preference value of the at least one reference advertisement is relatively greater than the reference value(s) of the other one(s) of the Internet advertisements. It is noted that the weighting value assigned to each of the different key terms of the collection is generally a default value, e.g., one. However, for certain one(s) of the different key terms, the weighting value(s) assigned thereto may be changed from the default value to a predetermined value greater than the default value in response to a specific factor. For instance, if the specific factor is related to seasonal use, the weighting value assigned to the key term "air conditioner" is changed from one to five in the summertime, and the weighting value assigned to the key term "electric kettle" is changed from one to five in the wintertime.

For example, if the target TV advertisement is related to a Zojirushi dishwasher, the key term content corresponding to the target TV advertisement includes the key terms of "home appliance", "Zojirushi" and "dishwasher". Table 1 exemplarily shows the different key terms, and their cumulative numbers and weighting values that are included in the user preference data associated with the user terminal. For convenience of explanation, Table 2 exemplarily shows five Internet advertisements numbered A1 to A5 and provided by the server 3, and key terms representative of the Internet advertisements (A1~A5). For the five Internet advertisements (A1~A5), there exists at least one common key term, i.e., "home appliance".

TABLE 1

| Key term | Cumulative number | Weighting value |
|---|---|---|
| home appliance | 130 | 1 |
| Zojirushi | 20 | 1 |
| Hitachi | 50 | 1 |
| electric kettle | 12 | 1/5 (summer/winter) |
| air conditioner | 10 | 5/1 (summer/winter) |
| computer | 70 | 1 |
| Apple | 60 | 1 |
| notebook computer | 30 | 1 |

TABLE 2

| | Internet advertisement | Key term |
|---|---|---|
| A1 | Zojirushi electric kettle | home appliance; Zojirushi; electric kettle |
| A2 | Zojirushi rice cooker | home appliance; Zojirushi; rice cooker |
| A3 | Hitachi air conditioner | home appliance; Hitachi; air conditioner |
| A4 | Hitachi washing machine | home appliance; Hitachi; washing machine |
| A5 | Panasonic washing machine | home appliance; Panasonic; washing machine |

Thus, the preference values of the Internet advertisements (A1-A5) are shown in Table 3.

TABLE 3

| | Internet advertisement | Preference value |
|---|---|---|
| A1 | Zojirushi electric kettle | 130 × 1 + 20 × 1 + 12 × 1 = 162/ 130 × 1 + 20 × 1 + 12 × 5 = 210 (summer/winter) |
| A2 | Zojirushi rice cooker | 130 × 1 + 20 × 1 + 0 = 150 |
| A3 | Hitachi air conditioner | 130 × 1 + 50 × 1 + 10 × 5 = 230/ 130 × 1 + 50 × 1 + 10 × 1 = 190 (summer/winter) |
| A4 | Hitachi washing machine | 130 × 1 + 50 × 1 + 0 = 180 |
| A5 | Panasonic washing machine | 130 × 1 + 0 + 0 = 130 |

In this example, if the number of the reference advertisements is limited to three, with the Internet advertisements (A1, A3, A4) having relatively greater preference values (i.e., 162/210, 230/190 and 180) compared to those of the Internet advertisements (A2, A5) (i.e., 150 and 130), the Internet advertisements (A1, A3, A4) are determined as the reference advertisements.

In step S34, the data generation module 323 of the processing unit 32 is generates, based on the Internet advertisement content that corresponds to the at least one reference advertisement determined in step S33, a reference advertisement menu in which the at least one reference advertisement is listed, and the wireless communication module 31 transmits the reference advertisement menu and the Internet advertisement content corresponding to each reference advertisement to the set-top box 1 via the wireless communication network 300. For example, if the Internet advertisement content corresponding to each Internet advertisement has an advertisement banner and an advertisement picture, the reference advertisement menu may be generated based on the advertisement banner corresponding to the at least one reference advertisement.

It is noted that, if more than one reference advertisement is determined by the reference advertisement determination module 32 in step S33, the reference advertisements are listed in the reference advertisement menu in the order of the preference values thereof. In accordance with the above example, the Internet advertisements (A3, A4, A1) as the reference advertisements are listed in the given order in the reference advertisement menu during the summertime, and the Internet advertisements (A1, A3, A4) are listed in the given order in the reference advertisement menu during the wintertime.

In step S35, upon receipt of the reference advertisement menu and the Internet advertisement content corresponding to each reference advertisement from the server 3, the set-top box 1 enables the TV 2 to display the reference advertisement menu using on-screen display (OSD) technique on the display of the target TV advertisement. In accordance with the previous example, if multiple reference advertisements are determined by the reference advertisement determination module 32 in step S33, the advertisement banners corresponding to the reference advertisements are shown in the reference advertisement menu. Thereafter, in response to a selection of one of the reference advertisements on the TV 2 by operation of a remote controller (not shown in drawings), the set-top box 1 enables the TV 2 to play the Internet advertisement content corresponding to the selected reference advertisement. At the same time, the set-top box 1 generates a response signal, which indicates the selected reference advertisement, and transmits the response signal to the wireless communication module 31 of the server 3 via the wireless communication network 300.

In step S36, upon receipt of the response signal from the set-top box 1 through the wireless communication module 31, the preference data update module 324 of the processing unit 32 updates the user preference data stored in the second database 332 based on the response signal by adding one to the cumulative number of each of the key terms, which are representative of the selected reference advertisement. In accordance with the above example, if the reference advertisement (A1) is selected, the user preference data is updated as the following Table 4.

TABLE 4

| Key term | Cumulative number | Weighting value |
|---|---|---|
| home appliances | 130 + 1 | 1 |
| Zojirushi | 20 + 1 | 1 |
| Hitachi | 50 | 1 |
| electric kettle | 23 + 1 | 1/5 |
| air conditioner | 10 | 5/1 |
| computer | 70 | 1 |
| Apple | 60 | 1 |
| notebook computer | 30 | 1 |

Figure 4:
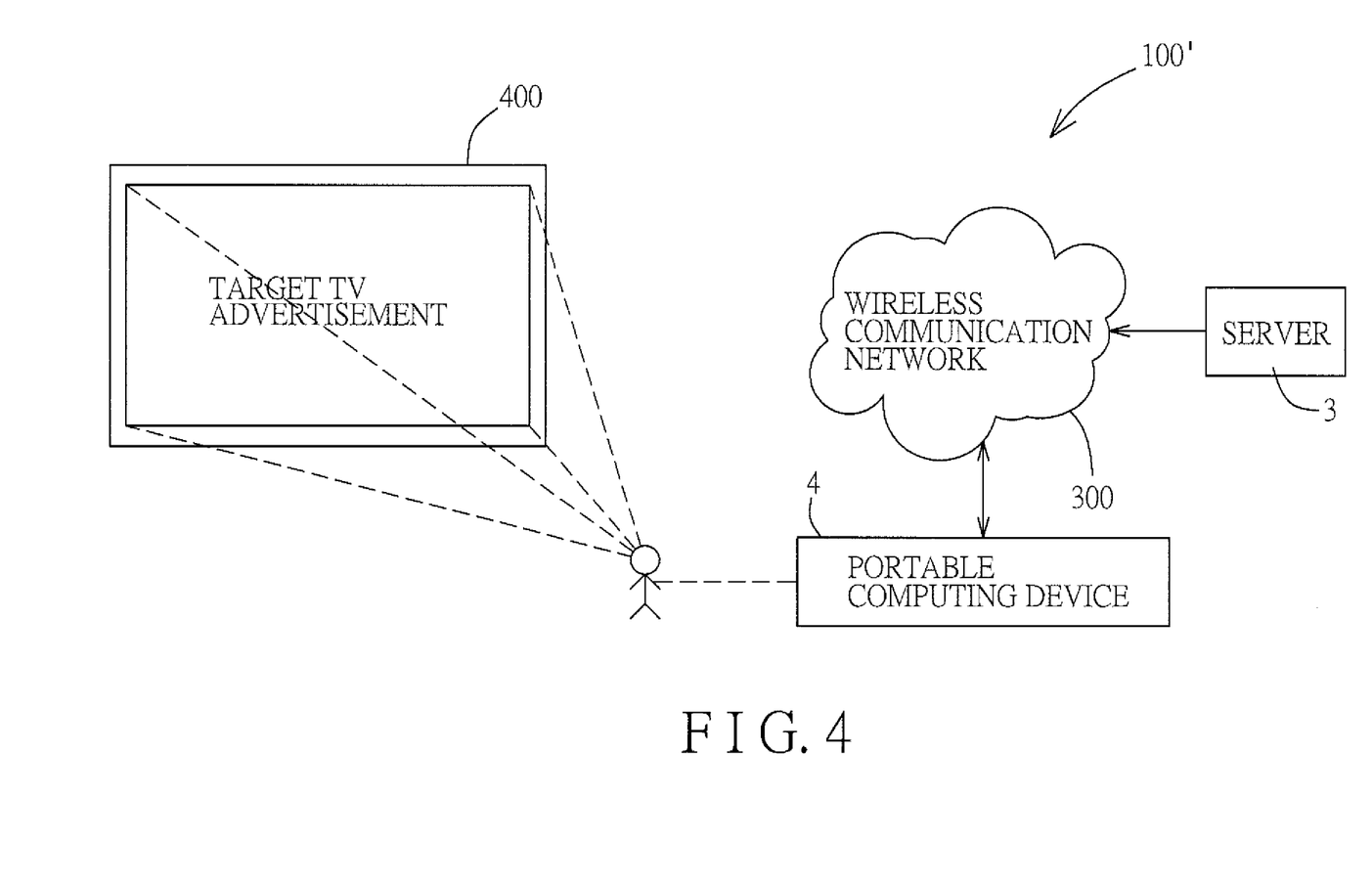
FIG. 4 is a schematic block diagram illustrating the second preferred embodiment of an interactive advertisement offering system according to the present invention.
Figure 5:
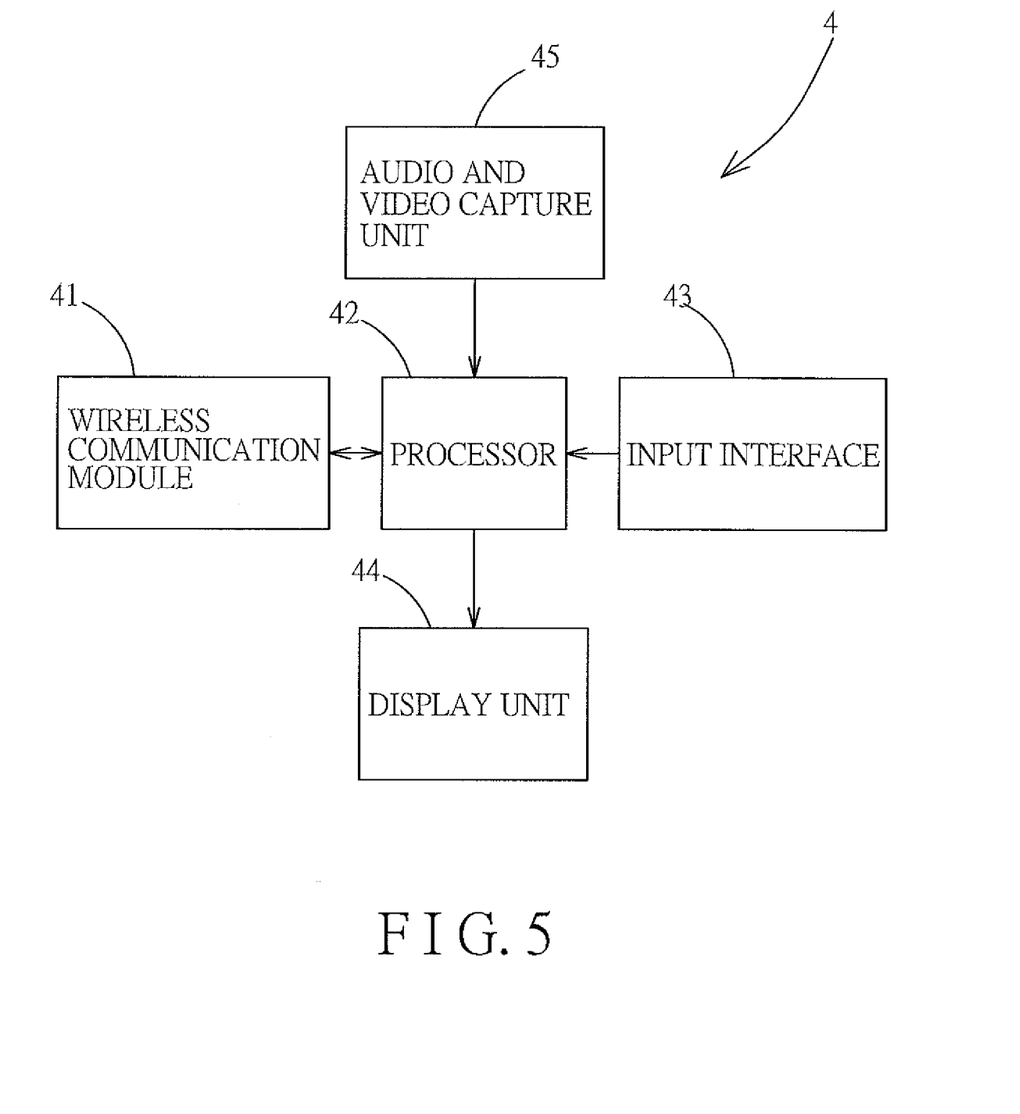
FIG. 5 is a schematic block diagram illustrating a portable computing device of the second preferred embodiment.

FIGS. 4 and 5 illustrate the second preferred embodiment of an interactive advertisement offering system 100' according to this invention, which is a modification of the first preferred embodiment. Unlike the previous embodiment, the user terminal is a portable computing device 4, such as a smart phone, a tablet computer or a notebook computer. The target TV advertisement is played on a TV 400, and is viewed by a user of the portable computing device 4. It is noted that the portable computing device 4 is located near the TV 400.

As shown in FIG. 5, the portable computing device 4 includes a wireless communication module 41, an input interface 43, a display unit 44, an audio and video capture unit 45, and a processor 42 coupled to the wireless communication module 41, the input interface 43, the display unit 44 and the audio and video capture unit 45. The audio and video capture unit 45 is operable to perform audio and/or video capture of the target TV advertisement played on the TV 400 so as to generate the input signal. The audio and video capture unit 45 consists of, for example, a Webcam and a voice recorder (not shown in the drawings). Thereafter, the input signal is outputted to the processor 42, and then transmitted to the server 3 through the wireless communication module 41. That is to say, in step S31 of FIG. 3, the input signal transmitted to the server 3 is audio and/or video data obtained through audio and/or video capture of the target TV advertisement played on the TV 400.

Therefore, the target advertisement judgment module 321 of the processing unit 32 of the server 3 compares the input signal with the identification data corresponding to each of the TV advertisements to judge said one of the TV advertisements, the identification data corresponding to which matches the input signal, to be the target TV advertisement (step S32 of FIG. 3). In this embodiment, the input signal includes audio and/or video data; the identification data corresponding to the target TV advertisement has the same audio and/or video fingerprint feature as the input signal. When the processor 42 receives the reference advertisement menu and the Internet advertisement content corresponding to the at least one reference advertisement transmitted from the server 3 through the wireless communication module 41, the processor 42 enables the display unit 44 to display the reference advertisement menu. Thereafter, in response to selection of one of the at least one reference advertisement on the display unit 44 by operation of the input interface 43, the processor 42 enables the display unit 44 to display the Internet advertisement content corresponding to the selected reference advertisement. At the same time, the processor 42 generates a response signal, which indicates the selected reference advertisement, and transmits the response signal to the server 3 through the wireless communication module 41 (step S35 of FIG. 3).

It is noted that, in this embodiment, the user preference data corresponds to one of a personal account number or UUID assigned to the user of the portable computing device 4, and an IP address, MAC address or UUTD assigned to the portable computing device 4.

To sum up, at least one reference advertisement is offered by the server 3 in accordance with the target TV advertisement viewed by the user at the user terminal. Furthermore, the reference advertisement(s) is(are) generated based on the user preference data, which is updated based on each reference advertisement previously selected by the user of the user terminal. Therefore, the interactive advertisement offering system 100, 100' and method of this invention can offer the reference advertisement(s) in an interactive manner by taking into account user requirements and preferences.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An interactive advertisement offering method to be implemented by a system that includes a user terminal, and a server connected to the user terminal via a wireless communication network, the server including a processing unit, and a database unit for pre-storing a plurality of television (TV) advertisement contents corresponding respectively to a plurality of TV advertisements, a plurality of Internet advertisement contents corresponding respectively to a plurality of Internet advertisements, a plurality of key term contents each corresponding to a respective one of the TV and Internet advertisements and each including a number of key terms that are representative of the respective one of the TV and Internet advertisements, and a plurality of identification data each corresponding to a respective one of the TV advertisements and each being generated based on the TV advertisement content that corresponds to the respective one of the TV advertisements, said interactive advertisement offering method comprising the steps of:

a) the user terminal transmitting an input signal to the server, the input signal being associated with a target TV advertisement;

b) the processing unit identifying one of the TV advertisements to be the target TV advertisement based on the input signal and the plurality of the identification data pre-stored in the database unit;

c) the processing unit determining one(s) of the Internet advertisements as at least one reference advertisement based at least on the key term contents pre-stored in the database unit, wherein the key term content, which corresponds to said at least one reference advertisement, and the key term content, which corresponds to the target TV advertisement, has at least one common key term; and d) the processing unit generating, based on the Internet advertisement content that corresponds to said at least one reference advertisement determined in step c), a reference advertisement menu in which said at least one reference advertisement is listed, and transmitting the reference advertisement menu and the Internet advertisement content that corresponds to said at least one reference advertisement to the user terminal, wherein, in step c):

the processing unit determines said at least one reference advertisement based further on user preference data associated with the user terminal, the user preference data including a collection of different key terms, each of which is representative of one or more reference advertisements previously selected by the user terminal and a plurality of cumulative numbers which correspond respectively to the different key terms of the collection, wherein the key term content, which corresponds to said at least one reference advertisement, the key term content, which corresponds to the target TV advertisement and the user preference data has at least one common key term; and each of the Internet advertisements has a preference value that is determined based at least on the cumulative number(s) corresponding to the key term(s), which is(are) representative of the Internet advertisement, the preference value of said at least one reference advertisement determined in step c) being relatively greater than the preference value(s) of the other one(s) of the Internet advertisements; and wherein, in step c):

the user preference data further includes a plurality of weighting values assigned respectively to the different key terms of the collection; and the preference value of each of the Internet advertisements is obtained by accumulating the product of the cumulative number and the weighting value corresponding to each of the key term(s), which is(are) representative of the Internet advertisement.

2. The interactive advertisement offering method as claimed in claim 1, wherein the Internet advertisement content of each of the Internet advertisements includes at least one of an advertisement banner, an advertisement picture, advertisement text, an advertisement film and advertiser contact information.

3. The interactive advertisement offering method as claimed in claim 1, wherein:

in step c), a plurality of the reference advertisements are determined by the processing unit; and in step d), the user terminal is configured to first display the reference advertisement menu upon receipt of the reference advertisement menu and of the Internet advertisement contents corresponding respectively to the reference advertisements from the server, and to then play the Internet advertisement content corresponding to a selected one of the reference advertisements, which are listed in the reference advertisement menu.

4. The interactive advertisement offering method as claimed in claim 3, wherein the reference advertisements are listed in the reference advertisement menu in the order of the preference values thereof.

5. The interactive advertisement offering method as claimed in claim 3, the database unit further storing the user preference data, wherein the user terminal further transmits to the server a response signal, which indicates the selected one of the reference advertisements, and the processing unit updates the user preference data stored in the database unit based on the response signal by adding one to the cumulative number of each of the key terms, which are representative of the selected one of the reference advertisements.

6. The interactive advertisement offering method as claimed in claim 5, the user terminal includes a set-top box, which communicates with the server via the wireless communication network to transmit the input signal and the response signal and which is connected to a TV broadcast system for receiving a multi-channel TV signal therefrom, and a TV connected electrically to the set-top box for playing the target TV advertisement, which is broadcasted on a selected TV channel that is supplied by the TV broadcast system, displaying the reference advertisement menu, and playing the Internet advertisement content that corresponds to the selected one of the reference advertisements, the processing unit of the server being further connected to the TV broadcast system for receiving the same multi-channel TV signal therefrom, wherein:

in step a), the input signal includes channel data that indicates the selected TV channel; and step b) includes the sub-steps of b-1) the processing unit extracting from the multi-channel TV signal, broadcasted data corresponding to the target TV advertisement based on the channel data of the time the TV target advertisement is played on the TV, and b-2) the processing unit comparing the broadcasted data extracted in sub-step b-1) with the identification data corresponding to each of the TV advertisements to identify said one of the TV advertisements, the identification data corresponding to which matches a portion of the broadcasted data, to be the target TV advertisement.

7. The interactive advertisement offering method as claimed in claim 6, wherein the identification data corresponding to the target TV advertisement and the portion of the broadcasted data have the same audio and/or video data.

8. The interactive advertisement offering method as claimed in claim 5, the target TV advertisement being played on a TV, the user terminal being a portable computing device located near the TV, wherein:

in step a), the user terminal is configured to perform audio and/or video capture of the target TV advertisement played on the TV so as to generate the input signal; and in step b), the processing unit comparing the input signal with the identification data corresponding to each of the TV advertisements to identify said one of the TV advertisements, the identification data corresponding to which matches the input signal, to be the target TV advertisement.

9. The interactive advertisement offering method as claimed in claim 8, wherein the identification data corresponding to the target TV advertisement has the same audio and/or video fingerprint feature as the input signal.

10. The interactive advertisement offering method as claimed in claim 1, wherein the user preference data corresponds to one of a personal account number or a universally unique identifier (UUID) assigned to the user of the user terminal, and an Internet protocol (IP) address, a media access control (MAC) address or an UUID assigned to the user terminal.

11. An interactive advertisement offering system comprising:

a server including a wireless communication module, a database unit, and a processing unit coupled to said communication module and said database unit; and a user terminal connected to said wireless communication module via a wireless communication network for transmitting an input signal to said wireless communication module, the input signal being associated with a target television (TV) advertisement;

wherein said database unit includes a first database for pre-storing a plurality of TV advertisement contents corresponding respectively to a plurality of TV advertisements in which the target TV advertisement is included, a plurality of Internet advertisement contents corresponding respectively to a plurality of Internet advertisements, and a plurality of key term contents each corresponding to a respective one of the TV and Internet advertisements and each including a number of key terms that are representative of the respective one of the TV and Internet advertisements, and
a second database for pre-storing a plurality of identification data each corresponding to a respective one of the TV advertisements and each being generated based on the TV advertisement content that corresponds to the respective one of the TV advertisements;
wherein said processing unit is configured to receive the input signal from said user terminal through said wireless communication module and to identify one of the TV advertisements to be the target TV advertisement based on the input signal and the plurality of the identification data pre-stored in said second database, to determine one(s) of the Internet advertisements as at least one reference advertisement based at least on the key term contents pre-stored in said first database, wherein the key term content, which corresponds to said at least one reference advertisement, and the key term content, which corresponds to the target TV advertisement, has at least one common key term, and to generate, based on the Internet advertisement content that corresponds to said at least one reference advertisement thus determined, a reference advertisement menu in which said at least one reference advertisement is listed, and to transmit the reference advertisement menu and the Internet advertisement content corresponding to said at least one reference advertisement to said user terminal through said wireless communication module, and
wherein:
said processing unit is configured to determine said at least one reference advertisement based further on user preference data associated with the user terminal, the user preference data including a collection of different key terms, each of which is representative of one or more reference advertisements previously selected by the user terminal, and a plurality of cumulative numbers which correspond respectively to the different key terms of the collection, wherein the key term content, which corresponds to said at least one reference advertisement the key term content which corresponds to the target TV advertisement, and the user preference data has at least one common key term;
each of the Internet advertisements has a preference value that is determined based at least on the cumulative number(s) corresponding to the key term(s), which is(are) representative of the Internet advertisement, the preference value of said at least one reference advertisement being relatively greater than the preference value(s) of the other one(s) of the Internet advertisements;
the user reference data further includes a plurality of weighting values assigned respectively to the different key terms of the collection; and
the preference value of each of the Internet advertisements is obtained by accumulating the product of the cumulative number and the weighting value corresponding to each of the key term(s), which is(are) representative of the Internet advertisement.

12. The interactive advertisement offering system as claimed in claim 11, wherein the Internet advertisement content of each of the Internet advertisements includes an advertisement banner, an advertisement picture, advertisement text, an advertisement film and advertiser contact information, said processing unit being configured to generate the reference advertisement menu based on the advertisement banners and/or the advertisement pictures corresponding to the reference advertisements such that the advertisement banners and/or the advertisement pictures corresponding to the reference advertisements are shown in the reference advertisement menu.

13. The interactive advertisement offering system as claimed in claim 11, wherein:
a plurality of the reference advertisements are determined by said processing unit of said server; and
said user terminal is configured to first display the reference advertisement menu upon receipt of the reference advertisement menu and of the Internet advertisement contents corresponding respectively to the reference advertisements from said server, and to then play the Internet advertisement content corresponding to a selected one of the reference advertisements, which are listed in the reference advertisement menu.

14. The interactive advertisement offering system as claimed in claim 13, wherein the reference advertisements are listed in the reference advertisement menu in the order of the preference values thereof.

15. The interactive advertisement offering system as claimed in claim 13, wherein:
said user terminal further transmits a response signal, which indicates the selected one of the reference advertisements, to said wireless communication module;
said second database further stores the user reference data; and
said processing unit is further configured to receive the response signal from said user terminal via said wireless communication module and to update the user preference data stored in said second database based on the response signal by adding one to the cumulative number of each of the key terms, which are representative of the selected one of the reference advertisements.

16. The interactive advertisement offering system as claimed in claim 15, wherein:
said user terminal includes
a set-top box communicating with said wireless communication module via the wireless communication network to transmit the input signal and the response signal, and used to be connected to a TV broadcast system for receiving a multi-channel TV signal therefrom, the input signal including channel data that indicates the selected TV channel, and
a TV connected electrically to said set-top box for playing the target TV advertisement, which is broadcasted on a selected TV channel supplied by the TV broadcast system, displaying the reference advertisement menu and playing the Internet advertisement content that corresponds to the selected one of the reference advertisements; and
said processing unit is used to be connected to the TV broadcast system for receiving the same multi-channel TV signal therefrom to extract from the multi-channel TV signal broadcasted data corresponding to the target TV advertisement based on the channel data of the time the TV target advertisement is played on said TV, said processing unit is further configured to compare the broadcasted data extracted thereby with the identification data that corresponds to each of the TV advertisements to identify said one of the TV advertisements, the identification data corresponding to which matches a portion of the broadcasted data, to be the target TV advertisement.

17. The interactive advertisement offering system as claimed in claim 16, wherein the identification data corresponding to the target TV advertisement and the portion of the broadcasted data have the same audio and/or video data.

18. The interactive advertisement offering method as claimed in claim 15, the target TV advertisement being played on a TV, wherein:
   said user terminal is a portable computing device used to be located near the TV, said user terminal being operable to perform audio and video capture of the target TV advertisement played on the TV so as to generate the input signal; and
   said processing unit is further configured to compare the input signal with the identification data corresponding to each of the TV advertisements to identify said one of the TV advertisements, the identification data corresponding to which matches the input signal, to be the target TV advertisement.

19. The interactive advertisement offering system as claimed in claim 18, wherein the identification data corresponding to the target TV advertisement has the same audio and/or video fingerprint feature as the input signal.

20. The interactive advertisement offering system as claimed in claim 11, wherein the user preference data corresponds to one of a personal account number or a universally unique identifier (UUID) assigned to the user of said user terminal, and an Internet protocol (IP) address, a media access control (MAC) address or an UUID assigned to said user terminal.

\* \* \* \* \*